US 7,002,991 B1

(12) United States Patent
Bolling

(10) Patent No.: US 7,002,991 B1
(45) Date of Patent: Feb. 21, 2006

(54) METHOD AND APPARATUS FOR PROVISIONING DISTRIBUTION CHANNELS IN A COMMUNICATIONS NETWORK

(75) Inventor: Anthony C. Bolling, Chatham, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 726 days.

(21) Appl. No.: 09/635,800

(22) Filed: Aug. 11, 2000

(51) Int. Cl.
*H04J 3/16* (2006.01)
*H04J 3/22* (2006.01)

(52) U.S. Cl. .................. 370/468; 370/485; 370/420; 370/443; 370/442

(58) Field of Classification Search ............ 370/229, 370/230, 231, 232, 233, 234, 235, 236, 237, 370/376, 386, 420, 421, 422, 352, 468, 485, 370/442, 443, 445, 458, 461, 320, 321, 335, 370/441, 493, 477, 437; 379/201.12, 201.03, 379/201.05, 221.01, 252, 269, 272, 270; 340/2.1; 455/452.2
See application file for complete search history.

(56) References Cited

U.S. PATENT DOCUMENTS

| | | | | |
|---|---|---|---|---|
| 5,381,405 A | * | 1/1995 | Daugherty et al. | 370/355 |
| 5,386,417 A | * | 1/1995 | Daugherty et al. | 370/352 |
| 5,570,355 A | * | 10/1996 | Dail et al. | 370/352 |
| 5,640,387 A | * | 6/1997 | Takahashi et al. | 370/359 |
| 5,724,659 A | * | 3/1998 | Daniel et al. | 455/452.2 |
| 5,781,537 A | * | 7/1998 | Ramaswami et al. | 370/254 |
| 5,953,344 A | * | 9/1999 | Dail et al. | 370/443 |
| 6,421,356 B1 | * | 7/2002 | Carter et al. | 370/468 |

OTHER PUBLICATIONS

National Communications System Technology & Standards Division, Telecommunications: Glossary of Telecommunication Terms, Federal Standard 1037C, GSA Information Technology Service, Aug. 7, 1996, D page.*

* cited by examiner

*Primary Examiner*—Wellington Chin
*Assistant Examiner*—Chuong Ho

(57) ABSTRACT

A method and an apparatus for user-based provisioning of distribution channels in a communications network allows an end user to select and initiate digital distribution channel allocation to accommodate their needs instead of submitting a service order to the telephone company each time a change in channel allocation is desired. In one implementation, a user-accessed provisioning terminal at a Distant Terminal (DT) receives a subscriber's distribution channel allocation selection after the user is authorized. The user's allocation selection is transmitted to a Remote terminal (RT) via a control channel, such as the Facility Data Line of an ESF-type T1 line or a dedicated data link that directly connects the DT and an RT. When the RT receives a provisioning message from a DT, the RT confirms that the provisioning selection is acceptable and automatically rearranges its time-slot interchange (TSI) connections according to the provisioning change initiated by the user. The RT sends an acknowledgement to the user-accessed provisioning terminal at the DT, which rearranges the TSI connections at the DT in accordance with the user's provisioning selection. If the RT cannot accommodate the user's provisioning selection, for example if there is insufficient feeder bandwidth to support the selected service, the RT notifies the user via the control channel and provisioning terminal so that the end user may select and initiate an alternative provisioning arrangement.

18 Claims, 4 Drawing Sheets

METHOD AND APPARATUS FOR PROVISIONING DISTRIBUTION CHANNELS IN A COMMUNICATIONS NETWORK

BACKGROUND OF THE INVENTION

1. Field of the Invention

The present invention relates to the field of communications, and more particularly to an apparatus and a method for provisioning distribution channels in a communications network.

2. Description of Related Art

Using digital loop carrier (DLC) technology, telephone companies are now able to efficiently serve large numbers of subscribers and expand the capacity of their networks. In contrast to a conventional local loop, i.e. a voice frequency (VF) channel formed by running copper wire pairs between each subscriber and a central office, a DLC system connects a number of subscribers to a central office through high-bandwidth digital transmission lines, such as fiber-optic or T1 lines. Next Generation Digital Carrier Loop (NGDLC) systems include time slot interchange (TSI) capability, which allows the service provider to establish and change connections between subscribers and digital distribution channels.

For a typical high-bandwidth transmission line, a plurality of digital channels, e.g., for carrying VF signals from a plurality of telephones, are provided on a single line by time division multiplexing. For example, a DS-1 (Digital Signal Level 1) format T1 line provides 24 digital channels by dividing time frames into 24 time slots to achieve a transmission rate of 1.544 Mbps (64 kbs per channel plus an 8 kbps control channel, which for an Extended SuperFrame (ESF)-type T1 line is divided into a 2 kbps framing channel, a 2 kbps Cydic Redundancy Check (CRC) channel, and a 4 kbps message channel, called the Facility Data Line).

One particular network configuration which incorporates NGDLC technology uses high-bandwidth transmission lines, such as a group of fiber-optic or T1 lines, to connect a central office (CO) to each of a plurality of remote terminals (RTs), thereby forming a feeder network, and connect a number of distant terminals (DTs) to each RT, thereby forming a distribution network. A DT typically provides voice and/or data services to a number of subscribers in a local geographic region, such as a residential neighborhood, a college campus, or a business facility, and serves as an interface between various information sources/destinations ("drop points"), such as telephone, fax machines, local area networks (LANs), etc., and the digital transmission line connected to an RT. In this configuration, an RT cross-connects distribution channels, i.e., the time-division multiplexed digital channels provided on the high-bandwidth transmission line(s) between DTs and an RT, with feeder channels, i.e., time-division multiplexed digital channels provided on the transmission line(s) between an RT and the central office.

The telephone company controls how the time-division multiplexed feeder and distribution channels (e.g., time slots of a DS-1 format T1 line) are allocated by setting the cross-connections of TSI units at the RT and the DT, respectively, and storing cross-connection information in an administrative database. For example, a certain number of distribution channels may be allocated for serving telephone drop points, while other distribution channels are allocated for serving other types of drop point, such as a LAN or a Private Branch Exchange (PBX), by making the appropriate TSI settings. Cross-connection tables, which can be remotely accessed by the telephone company via a data link, are stored in memory to control the TSI units of the RT and the DT to properly provision the available distribution channels.

Although telephone companies typically manage the TSI units at each DT of a network configuration remotely, a subscriber that needs to change their distribution channel allocation must send a service order to the telephone company before a new channel allocation can be implemented. Since this provisioning requires that the telephone company be involved, however, it often takes several days, if not several weeks, to occur after the service order is placed.

SUMMARY OF THE INVENTION

The present invention is a method and an apparatus for user-based provisioning of distribution channels in a communications network. In accordance with an embodiment of the present invention, an end user selects and initiates digital distribution channel allocation to accommodate their needs instead of submitting a service order to the telephone company each time a change in channel allocation is desired.

In one implementation, a user-accessed provisioning terminal at a DT receives a subscriber's distribution channel allocation selection after the user is authorized. The user's allocation selection is transmitted to a remote terminal via a control channel, such as the Facility Data Line of an ESF-type T1 line or a dedicated data link which directly connects the DT and an RT. When the RT receives a provisioning message from a DT, the RT confirms that the provisioning selection is acceptable and automatically rearranges its TSI connections according to the provisioning change initiated by the user. The RT sends an acknowledgement to the user-accessed provisioning terminal at the DT, which rearranges the TSI connections at the DT in accordance with the user's provisioning selection.

If the RT cannot accommodate the user's provisioning selection, for example if there is insufficient feeder bandwidth to support the selected service, the RT notifies the user via the control channel and provisioning terminal so that the end user may select and initiate an alternative provisioning arrangement. By allowing a subscriber to dynamically provision distribution channels, the subscriber is able to efficiently utilize available network resources. For example, if a subscriber needs to transmit/receive a large amount of data, the subscriber may temporarily allocate distribution channels to the data source/destination, thereby facilitating high data throughput rates. The subscriber may avoid interrupting other services, such as telephone services, by provisioning the digital distribution channels for data transfer at night, when phone usage is low.

BRIEF DESCRIPTION OF THE DRAWINGS

Other aspects and advantages of the present invention will become apparent from the following detailed description and upon reference to the drawings in which.

DETAILED DESCRIPTION

The present invention is a method and an apparatus which enables an end user to provision distribution channels in a communications network. According to an embodiment of the present invention, an end user allocates digital distribution channels of a communications network with includes digital carrier loop (DLC) technology.

Figure 1:
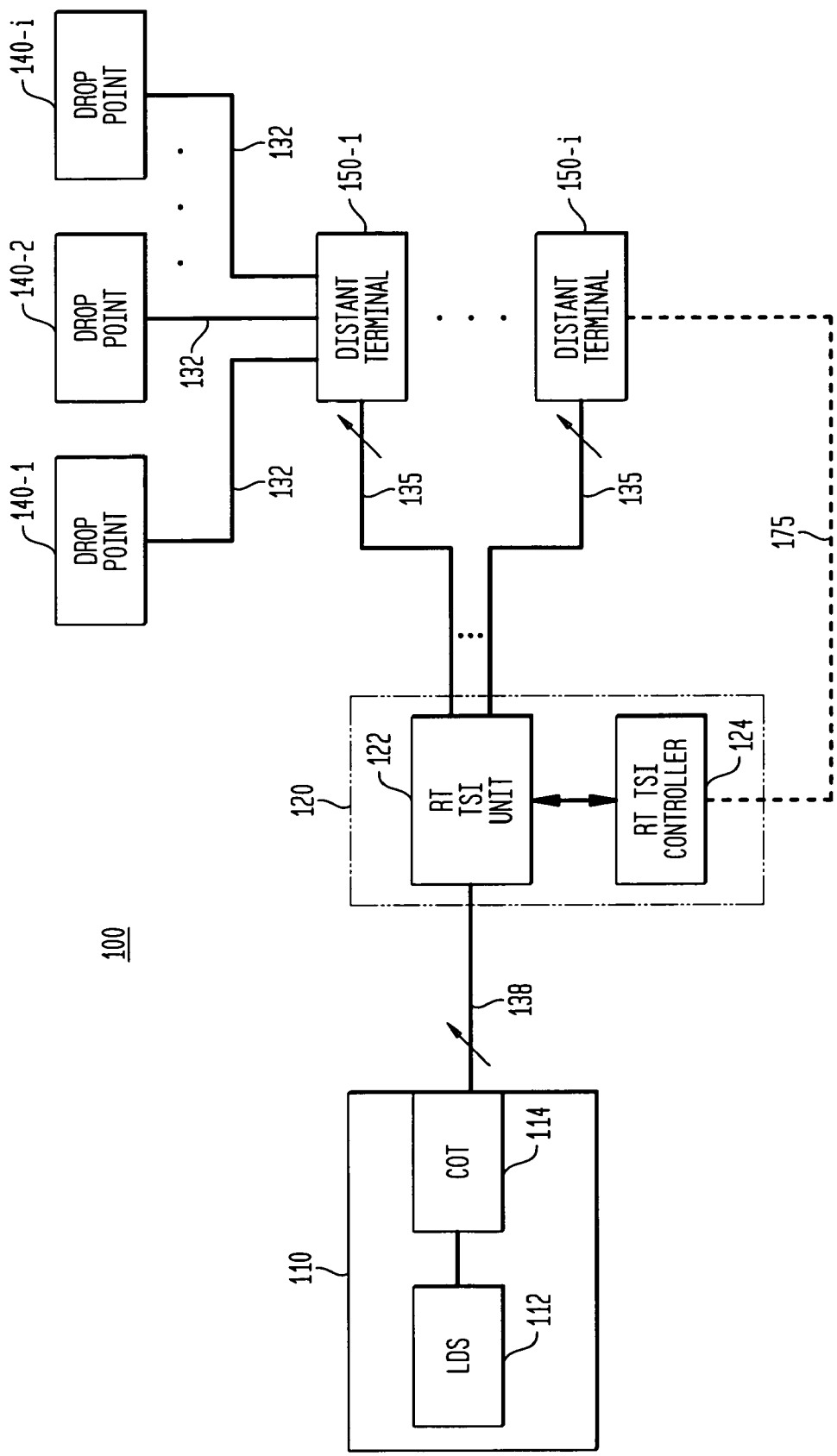
FIG. 1 illustrates an exemplary network configuration utilizing digital loop carrier technology and to which principles of the present invention may be implemented to enable an end user to provision distribution channels.

FIG. 1 illustrates an exemplary network configuration which is suitable for implementing embodiments of the present invention. As shown in FIG. 1, a communications network 100 includes a central office (CO) 110, a remote terminal (RT) 120, a plurality of distant terminals (DTs) 150-1, . . . , 150-$i$, and a number of subscriber drop points 140-1, . . . , 140-$i$ fed off an associated DT 150-1. The subscriber drop points 140-1 . . . 140-$i$ are connected to their associated DT 150-1 via narrow-band analog lines 132, such as copper wire pairs. Each of the DTs 150-1, . . . , 150-$i$ is connected to the RT 120 via a high-bandwidth digital transmission line (or a group of transmission lines) 135 (hereinafter "RT-DT transmission line 135"), such as a fiber optic or T1 line. The RT-DT transmission line 135 provides a number of distribution channels, e.g., 24 time-division multiplexed channels, between the DT 150-1 and the RT 120. As discussed in more detail below, the DT 150-1 may also connect to the RT 120 via a data link 175 to directly exchange control information, including distribution channel allocation messages.

The RT 120 is connected to the CO 110 via a high-bandwidth transmission line (or a group of transmission lines) 138 (hereinafter, "RT-CO transmission line 138"). The RT-CO transmission line 138 provides a number of digital feeder channels, e.g., 96 channels time-division multiplexed on four T1 lines (24 channels per T1 line). The RT 120 may also be connected to a separate private or public packet-switched network, such as a frame relay network (not shown).

The central office 110 includes a local digital switch (LDS) 112 which, in accordance with a directory number translation table (not shown), routes calls to/from other switching nodes, i.e., to/from other central offices of the Public Switched Telephone Network (PSTN). The central office 110 further includes a central office terminal (COT) 114, which is connected to a TSI unit 122 of the remote terminal 120. The COT 114 may be an optical multiplexer or a collection of T1 repeaters.

When the central office 110 receives a call for one of the subscriber drop points served by the DT 150-1 from the PSTN, the central office transmits the voice/data to the RT 120 via the COT 114 and an allocated feeder channel of the RT-CO transmission line 138 after the call connection has been set-up using conventional signaling links, e.g., SS7 signaling links. The TSI unit 122 of the remote terminal 120 distributes voice/data received from the central office 110 to the DT 150-1 using an allocated distribution channel which is realized as a time-division multiplexed channel provided on the RT-DT transmission line 135. For this purpose, the RT 120 includes an RT TSI unit 122 and an RT TSI controller 124 which associates each distribution channel of the RT-DT transmission line 135 with one of the drop points 140-1, . . . , 140-$i$ of the DT 150-1, and associates each distribution channel with a feeder channel (i.e., a time-slot of the RT-CO transmission line 138) to "cross-connect" each distribution channel of the RT-DT transmission line 135 with a feeder channel of the RT-CO transmission line 138. The RT TSI controller 124 includes a cross-connection table to store the associations between distribution channels of the RT-DT transmission line 135 and the drop points 140-1, . . . , 140-$i$ and associations between the distribution channels of the RT-DT transmission line 135 and the feeder channels of the RT-CO transmission line 138.

It should be apparent to one having ordinary skill in the art that the network configuration 100 illustrated in FIG. 1 may be modified in various ways. For example, the RT 120 may be a component of the CO 110 instead of being remotely situated.

Figure 2:
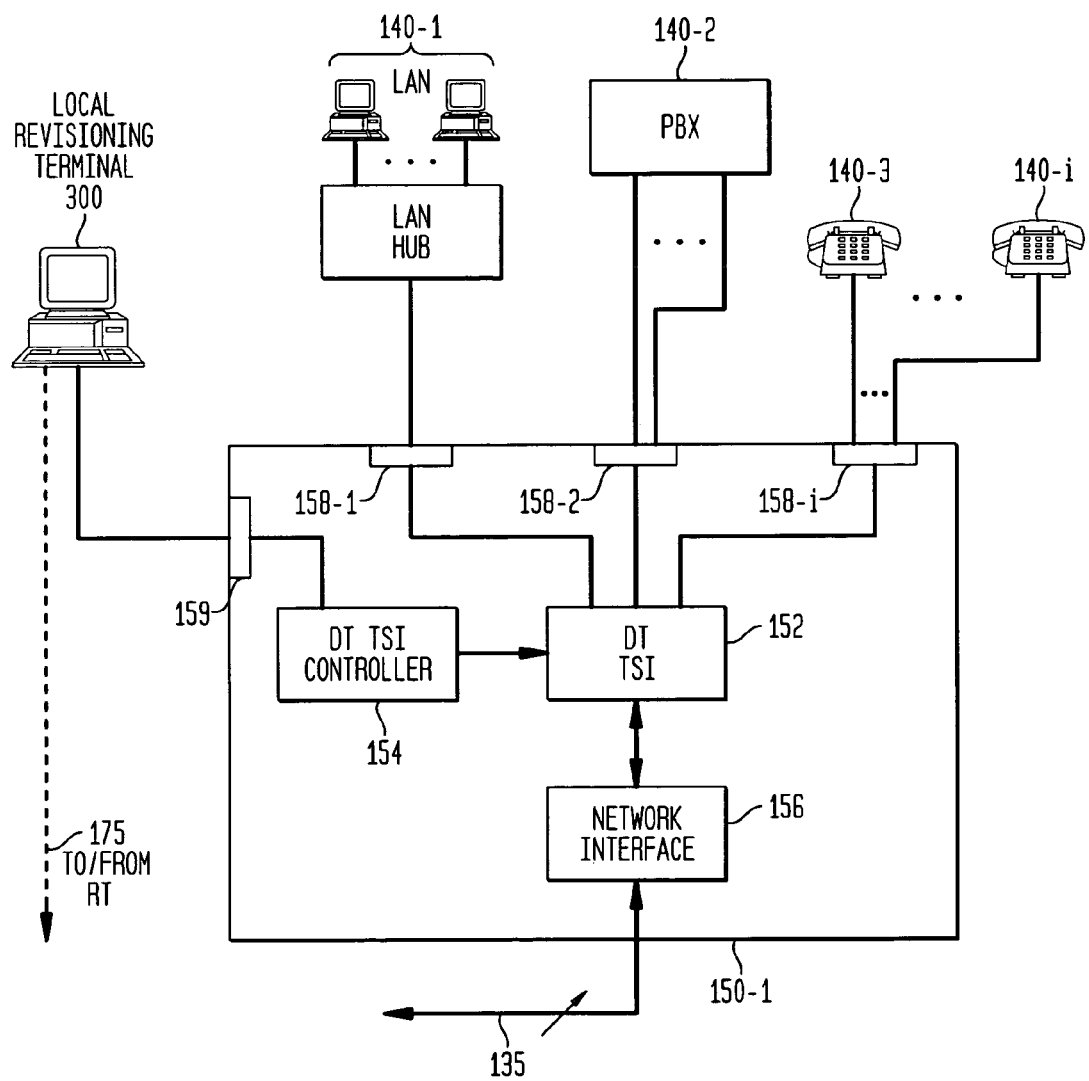
FIG. 2 illustrates a configuration of a distant terminal connecting a number of subscriber drop points to a high-bandwidth digital transmission line.

FIG. 2 illustrates an exemplary configuration of the DT 150-1 in accordance with an embodiment of the present invention. As described above, the DT 150-1 serves as an interface between a plurality of voice and/or data drop points, which are shown by way of example in FIG. 2 as including a LAN 140-1, a PBX 140-2, and telephones 140-3, . . . 140-$i$, and distribution channels of the RT-DT transmission line 135. As discussed above, a DS-1 format T1 line provides a transmission rate of up to 1.544 Mbps by dividing the available bandwidth of the transmission line into 24 time-division multiplexed channels, each operating at 64 kbps (plus an 8 kbps channel, which includes a 4 kbps message channel for an ESF-type T1 line). Using the time-division multiplexed channels, a T1 line consolidates multiple lower-rate voice and/data information signals from the subscriber drop points 140-1 . . . 140-$i$ served off the DT 150-1. The DS-1 format T1 line traffic is a digital bitstream, e.g., sampled and digitized voice signals using pulse code modulation (PCM) and compressed using linear predictive encoding.

To connect drop points to the time-division multiplexed distribution channels of the RT-DT transmission line 135, the DT 150-1 includes a DT TSI unit 152, a DT TSI controller 154, and a network interface 156 between the DT TSI unit 152 and the RT-DT transmission line. The DT TSI controller 154 of the DT 150-1 is connected to a local provisioning terminal 300 via a standard port, such as an RS-232 port. As discussed in more detail below, a subscriber utilizes the local provisioning terminal 300 in accordance with principles of the present invention to make provisioning selections which are subsequently transmitted to the RT 120.

Each of the drop points 140-1 . . . 140-$i$ is respectively connected to the DT TSI unit 152 via a service port 158-1, . . . , 158-$i$. The specific service port used will vary depending on the type of drop point to which the service port is connected. For the exemplary drop points shown in FIG. 2, the service port 158-1, connected to the LAN 140-1, may be a 10Base-T port (assuming an Ethernet 10Base-T LAN); the service port 158-2, connected to analog/digital trunk ports of the PBX 140-2, may be a Foreign Exchange, Office (FXO) Channel Unit; and the service port 158-$i$, connected to a number of telephones 140-4, . . . , 140-$i$, may be a Foreign Exchange, Station (FXS) Channel Unit. Similar to the RT TSI controller 124 discussed above, the DT TSI controller 154 may include a cross-connection table which stores the associations between the distribution channels of the RT-DT transmission line 135 and the service ports 158-1, . . . , 158-$i$.

Figure 3:
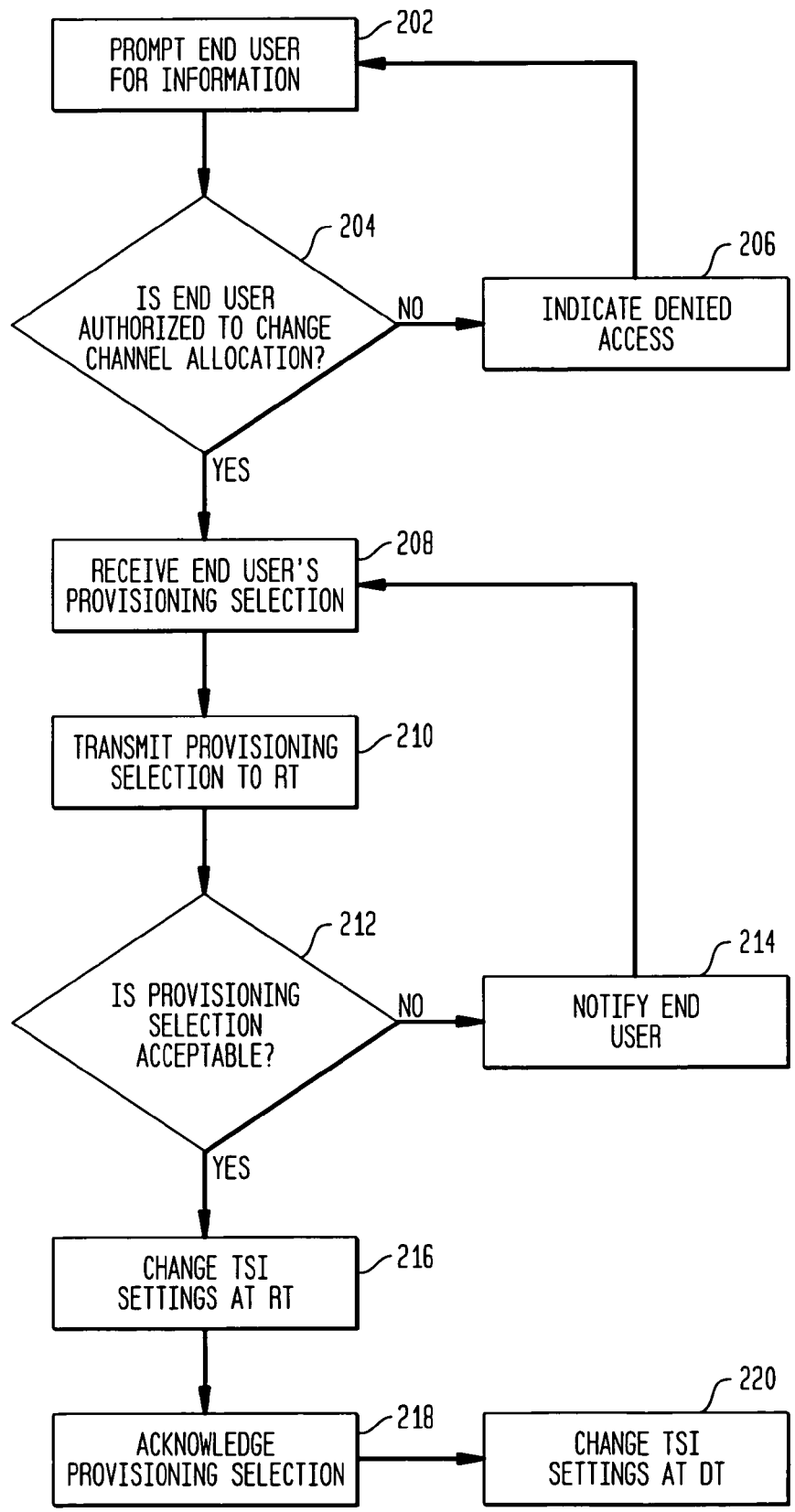
FIG. 3 is a flow diagram illustrating a user-initiated provisioning technique according to an embodiment of the present invention.

FIG. 3 is a flow diagram illustrating a user-initiated method of provisioning distribution channels in accordance with an embodiment of the present invention. In accordance with an embodiment of the present invention, an end user is able to change the associations between distribution channels of the RT-DT transmission line 135 and service ports 158-1, ..., 158-i stored by the DT TSI controller 154 via the local provisioning terminal 300. More specifically, the local provisioning terminal 300 initially prompts the user for authorization information (step 202), and verifies that the user is authorized to provision distribution channels (step 204), for example by comparing a password entered by the user with an access password assigned to the local provisioning terminal 300. When authorization is denied, the local provisioning terminal advises the user, e.g., via a visual display (step 206). After successful authorization, the local provisioning terminal 300 prompts the user for a distribution channel allocation request (step 208), for example using graphical user interface displays. The local provisioning terminal 300 creates an allocation control message based on the end user's selection and transmits the allocation control message to the RT 120 via a control channel, such as the dedicated data link 175 (step 210). Alternatively, the channel allocation control message may be sent to the RT 120 via the RT-DT digital transmission line 135, e.g., using the 4 kbps Facility Data Line of an ESF-type T1 line.

Upon receiving a channel allocation message from the DT 150-1, the RT 120 determines whether the end user's provisioning selection is acceptable (step 212). If the user's provisioning selection is acceptable, the RT TSI controller 124 makes the necessary changes to the cross-connections of the RT TSI unit 122 to fulfill the provisioning change initiated by the end user (step 216), and sends an acknowledgement to the DT 150-1 via the data link 175 or a control channel of the RT-DT transmission line 135 (step 218). Having received an acknowledgement from the RT 120, the local provisioning terminal 300 changes the cross-connections of the DT TSI controller 154 to effectuate the new distribution channel allocation (step 220).

If the RT 120 is unable to accommodate the user's provisioning request, for example if there is insufficient feeder bandwidth to support the selected service, the RT 120 notifies the DT 150-1 (step 214) so that the end user may initiate an alternative provisioning selection.

Figure 4:
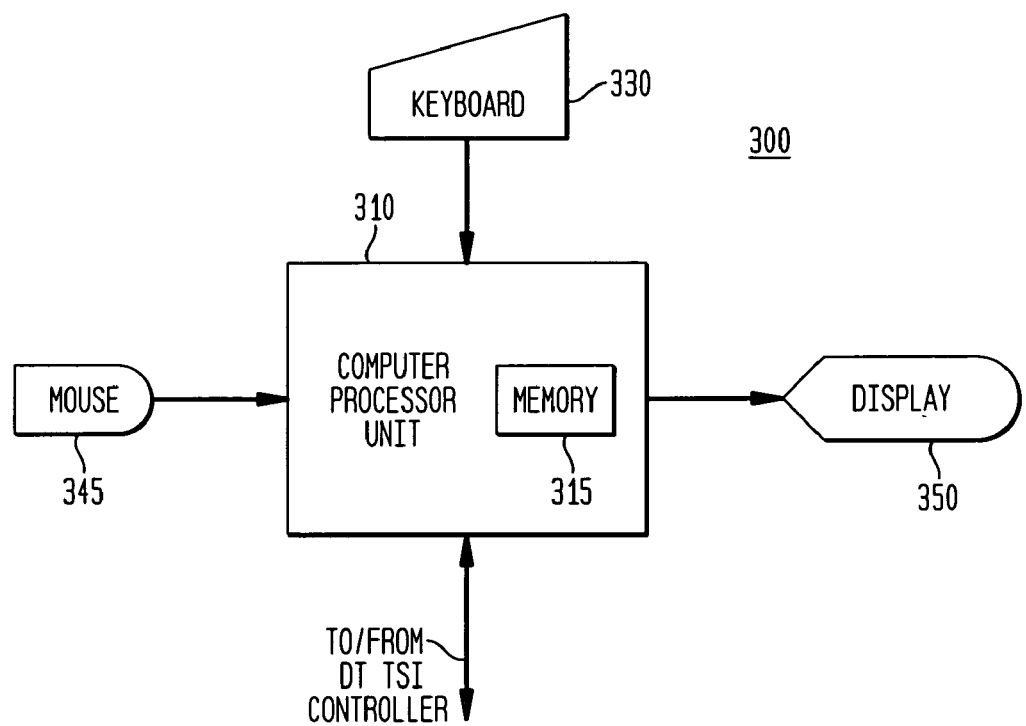
FIG. 4 is a general block diagram of an exemplary subscriber terminal configuration for implementing user-initiated distribution channel allocation in accordance with an embodiment of the present invention.

FIG. 4 is a general block diagram of an exemplary configuration for the local provisioning terminal 300 according to an embodiment of the present invention. As shown in FIG. 4, the provisioning terminal 300 includes a computer processor unit 310 having a memory 315. To allow user interaction with the computer processor unit 310, i.e., to enter user authorization and distribution channel provisioning selections, the provisioning terminal 300 includes a keyboard 330 and a mouse 345. The provisioning terminal 300 also includes a display 350, such as a cathode ray tube or a flat panel display, for displaying information such as user prompts for authorization information and provisioning selections. The memory 315 stores a computer program which executes the functions described above with regard to the flow diagram of FIG. 3 for achieving end user initiated provisioning. The program embodying the dynamic provisioning technique of the present invention may be loaded into the memory 315 of the provisioning terminal 310, for example from a disk or data network connection, the result being that the general purpose computer processing unit 310 becomes a special purpose machine which implements the user-initiated provisioning technique of the present invention.

Advantageously, the above-detailed embodiment of the present invention allows end users to efficiently utilize network resources by enabling real-time changes to digital distribution channel allocation, instead of requiring days or weeks for the telephone company to effectuate a channel provisioning request. In this way, the subscriber may make short-term provisioning changes to efficiently serve their needs. For example, when a business needs to transmit/receive a large amount of data, the subscriber may effectuate a distribution channel allocation in which a large percentage of distribution channels are dedicated to the data source/destination, thereby enabling high data throughput rates. By allowing a short-term distribution channel allocation change, the subscriber may also avoid interrupting other drop point services, such as telephone services, by provisioning the digital distribution channels for data transfer at night (i.e., when phone usage is typically low).

Various modifications of the present invention are contemplated which may be realized by those skilled the art without departing from the spirit and scope of the present invention.

What is claimed is:

1. A method of provisioning distribution channels in a communications network, comprising:
   receiving, at a remote provisioning control site, a subscriber provisioning selection via a subscriber accessible provisioning terminal;
   determining, at the remote provisioning control site, whether the subscriber provisioning selection is acceptable;
   sending an acknowledgment to the subscriber accessible provisioning terminal if the subscriber provisioning selection is acceptable;
   sending an error signal to the subscriber accessible provisioning terminal if the subscriber provisioning selection is not acceptable; and
   selectively changing an allocation of distribution channels for a plurality of drop-points in accordance with the subscriber provisioning selection if the subscriber provisioning selection is acceptable.

2. The invention as defined in claim 1, further comprising:
   transmitting said subscriber provisioning selection to the remote provisioning control site.

3. The invention as defined in claim 1, wherein said subscriber terminal requests a different subscriber provisioning selection upon receiving an error signal from said remote provisioning control site.

4. The invention as defined in claim 1, further comprising:
   confirming subscriber authorization for changing an allocation of distribution channels.

5. The invention as defined in claim 1, wherein said plurality of distribution channels are time division multiplexed, and said step of selectively changing distribution channel allocation changes cross-connections of a time slot interchange unit.

6. The invention as defined in claim 1, wherein said plurality of distribution channels are provided by a high-bandwidth transmission line.

7. The invention as defined in claim 6, wherein said high-bandwidth transmission line is a T1 line, and said plurality of distribution channels are time-division multiplexed on said T1 line.

8. The invention as defined in claim 1, wherein said subscriber site is a distant terminal in a digital loop carrier system.

9. The invention as defined in claim 2, wherein said remote provisioning control site is a remote terminal in a digital loop carrier system.

10. An apparatus for provisioning distribution channels in a communications network, comprising:

means for receiving a subscriber provisioning selection at a remote provisioning control site via a subscriber accessible provisioning terminal of a subscriber site where a plurality of distribution channels are allocated to a plurality of drop-points;

means for determining, at the remote provisioning control site, whether the subscriber provisioning selection is acceptable;

means for sending an acknowledgment to the subscriber accessible provisioning terminal if the subscriber provisioning selection is acceptable;

means for sending an error signal to the subscriber accessible provisioning terminal if the subscriber provisioning selection is not acceptable; and means for selectively changing an allocation of distribution channels for said plurality of drop-points in accordance with the subscriber provisioning selection if the subscriber provisioning selection is acceptable.

11. The invention as defined in claim 10, further comprising:

means for transmitting said subscriber provisioning selection to the remote provisioning control site.

12. The invention as defined in claim 10, wherein said means for receiving requests a different subscriber provisioning selection upon receiving an error signal from said remote provisioning control site.

13. The invention as defined in claim 10, further comprising:

means for confirming subscriber authorization for changing an allocation of distribution channels.

14. The invention as defined in claim 10, wherein said plurality of distribution channels are time division multiplexed, and said means for selectively changing distribution channel allocation changes cross-connections of a time slot interchange unit.

15. The invention as defined in claim 10, wherein said plurality of distribution channels are provided by a high-bandwidth transmission line.

16. The invention as defined in claim 15, wherein said high-bandwidth transmission line is a T1 line, and said plurality of distribution channels are time-division multiplexed on said T1 line.

17. The invention as defined in claim 10, wherein said subscriber site is a distant terminal in a digital loop carrier system.

18. The invention as defined in claim 11, wherein said remote provisioning control site is a remote terminal in a digital loop carrier system.

* * * * *